United States Patent [19]
Zondler et al.

[11] 3,912,762
[45] Oct. 14, 1975

[54] 1-AMINO-2-AMINOMETHYL-CYCLOHEXANES

[75] Inventors: Helmut Zondler, Allschwil, Switzerland; Wolfgang Pfleiderer, Constance, Germany

[73] Assignee: Ciba-Geigy Corporation, Ardsley, N.Y.

[22] Filed: July 19, 1973

[21] Appl. No.: 380,807

[30] Foreign Application Priority Data
July 28, 1972 Switzerland.................... 11294/72

[52] U.S. Cl. .......... 260/340.9; 260/2 N; 260/340.7; 260/464; 260/465.6; 260/563 C
[51] Int. Cl.$^2$................ C07D 319/06; C08G 59/10
[58] Field of Search...................... 260/340.7, 340.9

[56] References Cited
UNITED STATES PATENTS
3,459,771   8/1969   Niklas et al...................... 260/340.7

*Primary Examiner*—Anton H. Sutto
*Attorney, Agent, or Firm*—Charles W. Vanecek

[57] ABSTRACT

The 1-amino-2-aminomethyl-cyclohexane derivatives according to the invention are obtained by hydrogenation compounds which contain an acetal or ketal group in position 4. The diamines according to the invention are valuable hardeners for epoxide resins. The heat distortion of the moulded articles are superior to those articles in which amines of the prior art are used as hardeners.

9 Claims, No Drawings

1-AMINO-2-AMINOMETHYL-CYCLOHEXANES

The present invention provides new 1-amino-2-aminomethyl-cyclohexane derivatives of the formula I

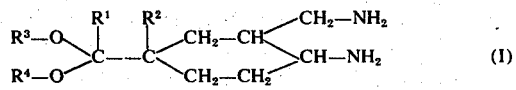 (I)

wherein $R^1$ und $R^2$ are the same or different and represent hydrogen or an alkyl radical with 1 to 5 carbon atoms, $R^3$ and $R^4$ are the same and represent a substituted or unsubstituted alkyl radical with 1 to 4 carbon atoms, or together represent an unsubstituted or substituted alkylene radical with 2 to 3 carbon atoms in the main chain, in which case $R^3$ and $R^4$ can together contain an additional amino group.

In formula I the radical $R^2$ preferably represents the methyl group and the radical $R^1$ represents a hydrogen atom or the methyl group.

A further preferred embodiment of the cyclohexane derivatives according to the invention comprises those compounds which, in accordance with formula I, contain as radicals $R^3$ and $R^4$ together one of the following unsubstituted alkylene radicals:

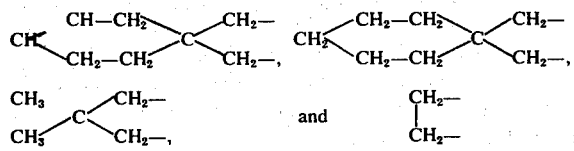

In principle, $R^3$ and $R^4$ can together also represent substituted alkylene radicals which additionally contain further amino groups. The radical

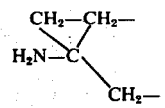

may be cited here for example.

The 1-amino-2-aminomethyl-cyclohexanes of the formula I are manufactured according to the invention by hydrogenating in known manner a cyano compound of the formula II

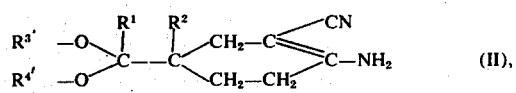 (II), in which $R^{3'}$ and $R^{4'}$ are the same or different and represent one of the radicals
$CH_3-(CH_2)_{\overline{0-3}}$
or together represent one of the divalent radicals

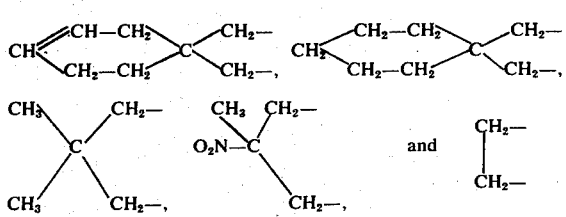

The hydrogenation takes place preferably in the presence of a catalyst. Raney nickel or Raney cobalt are particularly effective hydrogenation catalysts. It is also possible to use a cobalt oxide catalyst on a suitable carrier which is reduced in a stream of hydrogen to a cobalt-metal catalyst.

Further suitable hydrogenation catalysts are catalysts based on platinum or palladium which can be used as platinum black or palladium black, as colloidal platinum, or as platinum or palladium oxide or hydroxide catalysts. Suitable carrier materials for such catalysts are the customary materials, for example asbestos, pumice, diatomaceous earth, silica gel, silicic acid, activated charcoal, the sulphates, carbonates, or oxides of metals of groups II to VIII of the Periodic System, in particular magnesium, calcium, barium, zinc, aluminium, iron, chromium, and zirconium.

It is preferable to use very finely divided nickel or cobalt (Raney nickel or Raney cobalt) or Raney nickel with a small content of palladium.

The hydrogenation can be carried out by the methods conventionally employed in the laboratory and in industry both without pressure, e.g. in a shaking apparatus, or under pressure in an autoclave.

As solvents during the hydrogenation it is possible to use the organic solvents customarily employed together with the catalyst types cited hereinabove, in particular alcohols or ethers, for example methanol, ethanol, dioxan. The presence of ammonia during the nitrile hydrogenation produces favourable results.

The catalytic reduction is carried out as a rule by mixing the suspension or solution of the respective cyano compound of the formula II with the catalyst and passing hydrogen gas into the reaction mixture. In priciple it is possible to carry out the hydrogenation at atmospheric pressure and room temperature; but elevated pressures of 50 atmospheres and above are preferred, also elevated reaction temperatures in the range of 50° to 160°C, preferably 100° to 160°C. The hydrogenation is continued until no more hydrogen is absorbed. At the conclusion of the hydrogenation the catalyst is isolated, for example by filtration, and the solvent distilled off.

The hydrogenation can also be carried out by other known methods, for example by treatment with alkali metals, e.g. metallic sodium, dissolved in alcohol.

In addition to the specific 1-amino-2-aminomethylcyclohexane derivative a second product is also formed during the reaction according to the invention, namely the corresponding 1-amino-cyclohexane derivative which in α-position to the amino group contains a methyl group instead of the 2-aminomethyl group. The hydrogenation therefore proceeds in the secondary reaction according to the following chemical equation:

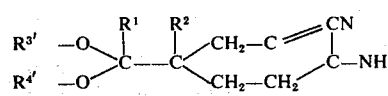
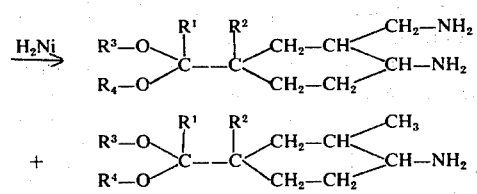

The 1-amino-2-methyl-cyclohexane derivatives which occur as by-product also constitute a new class of compounds. The distribution of the yields in respect of the specific 1-amino-2-aminomethyl-cyclohexane and the corresponding 1-amino-2-methyl-cyclohexane depends on the concentration of $NH_3$ during the hydrogenation. If the concentration of $NH_3$ is high the formation of the product last mentioned is suppressed; if the concentration on the other hand is low, the product occurs in substantial yield.

Suitable starting materials for the process according to the invention are, for example, the following cyano compounds of the formula II:

2-[(4'-amino-3'-cyano-1'-methyl)-3-cyclohexen-1-yl]dioxolane, 2-methyl-2[(4'-amino-3'-cyano-1'-methyl)-3-cyclohexen-1-yl]-dioxolane, 5,5-dimethyl-2-[(4'-amino-3'-cyano-1'-methyl)-3-cyclohexen-1-yl]-1,3-dioxan, 2,5,5-trimethyl-2-[(4'-amino-3'-cyano-1'-methyl)-3-cyclohexen-1-yl]-1,3-dioxan, 3-[(4'-amino-3'-cyano-1'-methyl)-3-cyclohexen-1-yl]-2,4-dioxa-spiro-[5,5]-8-undecene, 3-methyl-3-[(4'-amino-3'-cyano-1'-methyl)-3-cyclohexen-1-yl]-2,4-dioxa-spiro-[5,5]-8-undecene, 5-nitro-5-methyl-2-[(4'-amino-3'-cyano-1'-methyl)-3-cyclohexen-1-yl]-1,3-dioxan, 1-amino-2-cyano-4-methyl-4-dibutoxymethyl-cyclohexene.

The cyano compounds of the formula II (enamino nitriles) are manufactured by cyclisation of corresponding dinitriles of the formula III

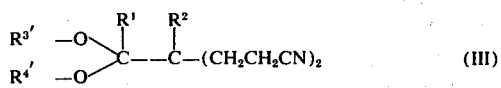

This cyclisation reaction can be carried out in accordance with already known directions wherein generally basic catalysts (alkali alcoholates, sodium hydride, sodium amide, metallic sodium or potassium) in combination with suitable solvents (toluene, ethanol, tert.-butanol, dioxan, tetrahydrofuran, dimethoxy ethane) are used. Particularly suitable are the systems sodium or potassium tert. butanol, or solutions of potassium or sodium in mixtures of naphthalene and tetrahydrofuran or naphthalene and dimethoxy ethane.

The 1-amino-2-aminomethyl-cyclohexanes of the formula I are valuable hardeners for epoxide resins. Their use as such leads to moulded articles, bonds and the like, which, with respect to the thermodynamic properties (heat distortion) are superior to those moulded articles and the like in which aliphatic amines of the prior art, e.g. isophorondiamine or ethylenediamine, are used as hardeners.

The amines according to the invention also constitute an advance in the art compared with the already known diamines containing acetal groups according to French Pat. No. 2,289,981 and German Offenlegungsschrift No. 1,909,343. Active substances with increased dimensional stability under heat are obtained on using the hardeners according to the invention in the curing of bisphenol-A epoxide resin which are of particular industrial importance. Particularly outstanding values are obtained by using the triamines according to the invention.

The present invention therefore also provides hardening mixtures which are suitable for the manufacture of moulded articles, impregnations, coattings, and bonds, and which contain a. a polyepoxide compound with on average more than one epoxide group in the molecule, and b. as curer a 1-amino-2-aminomethyl-cyclohexane derivative of the formula I. For each equivalent of epoxide groups of the polyepoxide compound (a) there are used appropriately 0.5 to 1.3 equivalents, preferably about 1.0 equivalent, of active hydrogen atoms bonded to nitrogen of the 1-amino-2-aminomethyl-cyclohexane derivatives of the formula I.

The curing of the mixture to give moulded articles or the like is effected at temperatures of 20° to 160°C. The mixtures are preferably thermosetting mixtures.

With reference to the manufacture, modification, processing, and choice of the epoxide compounds and the like there applies in respect of the mixtures according to the invention all that is comprehensively known to the expert from publication and relevant patent specifications.

The curable epoxide resin according to the invention find application primarily in the fields of surface protection, electrical engineering, laminating, and in the building trade. In a formulation adapted to the particular purpose they can be used in the unfilled or filled state, optionally in the form of solutions or emulsions, as paints, lacquers, moulding compositions, injection moulding formulations, dipping resins, casting resins, impregnating resins, binding resins, binding agents and adhesives, as mould resins, laminating resins, sealing compounds and fillers, floor covering compositions, and binders for mineral aggregates.

The following epoxide resins were used for the manufacture of curable mixtures described in the Examples:

EPOXIDE RESIN A

Polyglycidyl ether resin (commercial product) which is liquid at room temperature and consists principally of diomethane diglycidyl ether of the formula

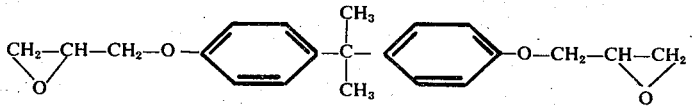

and is manufactured by condensation of diomethane (2,2-bis(p-hydroxyphenyl)-propane) with a stoichiometric excess of epichlorohydrin in the presence of alkali, and having the following constants:

epoxide content: 5.1 5.5 epoxide equivalents/kg
viscosity (Hoeppler) at 25°C : 9000–13000 cP.

EPOXIDE RESIN B

Diglycidyl ether resin (commercial product) with an epoxide content of 4.46 epoxide equivalents/kg which is liquid at room temperature, consists principally of hydrogenated diomethane diglycidyl ether of the formula

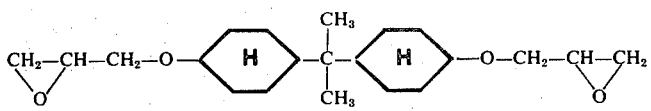

and is manufactured by condensation of hydrogenated diomethane (2,2-bis-(p-hydroxycyclohexyl)-propane) with a stoichiometric excess of epichlorohydrin in the presence of alkali.

EPOXIDE RESIN C

Tetrahydrophthalic diglycidyl ester with the following constants:
 epoxide content: 6.45 equivalents/kg
 viscosity (Hoeppler) at 25°C : 450–550 cP.

The mechanical properties (flexural strength, deflection, and heat distortion) of the curable mixtures described in the following Examples were tested by manufacturing sheets measuring 200 × 200 × 4 mm from which the test specimens corresponding to the norms were processed. In the following Examples the parts and percentages are by weight and the relationship of parts by volume to parts by weight is the same as that of the millilitre to the gram.

A. MANUFACTURING EXAMPLES

Manufacture of the Starting Products a.
2-[(4'-amino-3'-cyano-1-methyl)-3-cyclohexen-1-yl]dioxolane.

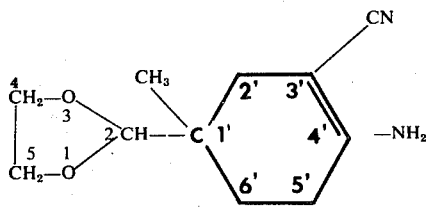

2.0 g of potassium are dissolved in 200 ml of tert. butanol, 104 g of bis-(β-cyanoethyl)-propionaldehyde-ethylene glycol acetal are added to the solution, and the mixture is refluxed for 5 hours. Upon addition of 50 ml of cyclohexane the product crystallises on cooling. Yield: 60.0 g, m.p. 89°–91°C. A further 15.0 g melting at 88°–90°C can be isolated by concentration of the filtrate and recrystallisation from a mixture of isopropanol and cyclohexane.

b.
2-methyl-2-[4'-amino-3'-cyano-1'-methyl)-3-cyclohexen-1-yl]-dioxolane.

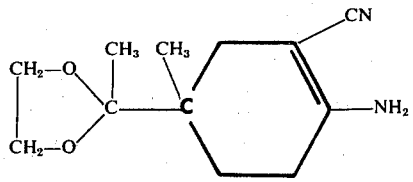

a mixture consisting of 22.2 g of 4-acetyl-4-methyl-pimelonitrile ethylene glycol ketal in a solution of 1.5 g of sodium in 30 ml of ethanol is refluxed for 5 hours. Then 50 ml of petroleum ether are added and the batch is allowed to cool, whereupon 13.8 g of crude product crystallise out which are recrystallised from 80 ml of carbon tetrachloride. Yield: 10.5 g with a melting point of 88°–93°C.

Analysis $C_{12}H_{18}N_2O_2$ (M = 222.29). calculated: C 64.84 H 8.16 N 12.60. found: C 65.05 H 8.08 N 12.78.

c. 5,5 dimethyl
2-[(4'-amino-3'-cyano-1'-methyl)-3-cyclohexen-1-yl]-1,3-dioxan

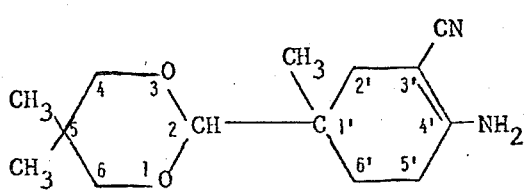

A solution of 101 g of bis-(β-cyanoethyl)-propionaldehydeneopentyl glycol acetal in 100 ml of toluene is added to a solution of 1.0 g of sodium in 200 ml of tert. butanol and the mixture is refluxed for 4 hours and then allowed to cool, whereupon 83.3 g (82.5% of theory) of substance crystallise out; melting point: 159°–160°C. A sample was recrystallised from toluene for the analysis; m.p. 159.5°–160.5°C.

Analysis $C_{14}H_{22}N_2O_2$ (M = 250.33). calculated: C 67.17 H 8.86 N 11.19. found: C 66.88 H 9.07 N 11.03.

d.
2,5,5,-trimethyl-2-[(4'-amino-3'-cyano-3'-cyano-1'-methyl)-3-cyclohexen-1-yl]-1,3-dioxan.

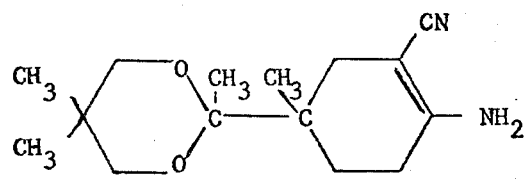

1.0 g of sodium in a mixture of 7.0 g of naphthalene in 70 ml of absolute tetrahydrofuran is boiled until it has dissolved. To the deep dark solution is added dropwise with 15 minutes at boiling temperature a solution of 50 g of 4-acetyl-4-methyl-pimelonitrile-neopentyl glycol ketal in 50 ml of absolute tetrahydrofuran. The mixture is boiled for 7 hours, then concentrated in a rotary evaporator and the residue is crystallised from 100 ml of toluene. The yield is 39.0 g (78% of theory) of substance with a melting point of 143°–144°C. A sample was recrystallised from ethanol for the analysis; m.p. 143°–144°C.

Analysis $C_{15}H_{24}N_2O_2$ (M = 264.36). calculated: C 68.15 H 9.15 N 10.60. found: C 68.06 H 9.20 N 10.64.

e.
3-[(4'-amino-3'-cyano-1'-methyl)-3-cyclohexen-1-yl]-2,4-dioxa-spiro-[5,5]-8-undecene.

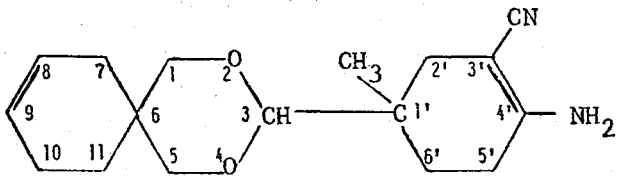

1.0 g of sodium in a mixture of 7.0 g of naphthalene and 200 ml of absolute tetrahydrofuran is boiled until it has dissolved. To the deep dark solution is added dropwise within 1 hour at reflux temperature a solution of 51.3 g of the acetal from bis-(β-cyanoethyl)-propionaldehyde and 4,4-bis-(hydroxymethyl)-cyclohexene in 25 ml of absolute tetrahydrofuran. The mixture is boiled for 5 hours and then concentrated and the residue is recrystallised from 300 ml of toluene to yield 37.1 g (72.3% of theory) of substance melting at 163°–164°C. a sample was recrystallised from ethanol for the analysis; m.p. 163°–164°C.

Analysis $C_{17}H_{24}N_2O_2$ (M = 288.38).
calculated: C 70.80 H 8.39 N 9.71.
found: C 70.50 H 8.41 N 9.63.

The mass spectrum shows the molecular peak at $m/e$ 288.

f.
3-methyl-3-[(4'-amino-3'-cyano-1'-methyl)-3-cyclohexen-1-yl]-2,4-dioxa-spiro-[5,5]-8-undecene.

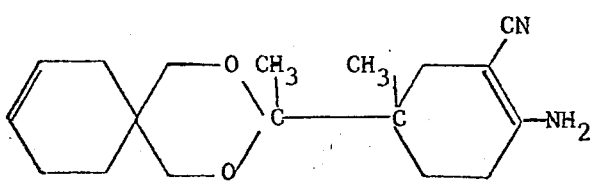

1.0 g of sodium in a mixture of 7.0 g of naphthalene and 150 ml of absolute tetrahydrofuran is boiled until it has dissolved. To the deep dark solution is added dropwise within 75 minutes at reflux temperature a solution of 50 g of the ketal from 4-acetyl-4-methyl-pimelonitrile and 4,4-bis-(hydroxy-methyl)-cyclohexene in 50 ml of absolute tetrahydrofuran. The mixture is boiled for 3½ hours, then concentrated in a rotary evaporator, and the residue is recrystallised from 150 ml of ethanol to yield 30.1 g of substance which melts at 133°–136°C. A small sample was recrystallised for the analysis; m.p. 136°–137°C.

Analysis $C_{18}H_{26}N_2O_2$ (M = 302.40).
calculated: C 71.49 H 8.68 N 9.26. found: C 71.77 H 8.64 N 9.21.

g.
5-nitro-5-methyl-2-[(4'-amino-3'-cyano-1'-methyl)-3-cyclohexan-yl]-1,3-dioxan

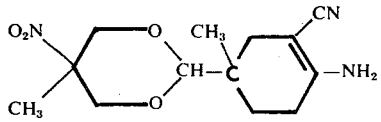

56.2 g of cyclic acetal, manufactured from bis-(β-cyanoethyl)-propionaldehyde and 2-methyl-2-nitro-1,3-diol, are added to a solution of 3 g of sodium in a mixture of 450 ml of tert. butanol and 110 ml of n-hexane, and the resulting suspension is stirred for 4 hours at 70°C internal temperature. The suspension is cooled, the product collected by suction filtration, washed with hexane, and dried at 60°C in vacuo. Yield: 50.7 g (90.2%). The recrystallisation from 1 litre of n-butanol yields 43.5 g (77.4%) with a melting point of 188°–189°C (melting point of starting product 124°–126°C). The IR spectrum shows the frequency of the nitrile band characteristic of enaminonitriles at 2170 cm$^{-1}$, which in contrast to the nitrile band of the starting product (2250 cm$^{-1}$) appears to be about 70–80 cm$^{-1}$ longer in wave.

h.
1-amino-2-cyano-4-methyl-4-dibutoxymethyl-cyclohexene.

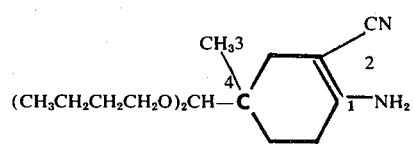

58.2 g of bis-(β-cyanoethyl)-propionaldehyde-n-butylacetal are added to a solution of 1.2 g of sodium in a mixture of 120 ml of tert. butanol and 30 ml of n-hexane and the batch is heated for 5 hours to 70°C. No product crystallises out after the mixture has cooled. The mixture is concentrated in a rotary evaporator and an IR spectrum is taken of the oily residue (60 g). The nitrile band appears at the same position at 2170 cm$^{-1}$ as in Example g), from which a cyclisation to the above compound can be deduced.

Manufacture of the
1-amino-2-aminomethyl-cyclohexane Derivatives
According to the Invention 1.
2-[(4'-amino-3'-aminomethyl-1'-methyl)-cyclohexyl-dioxolane

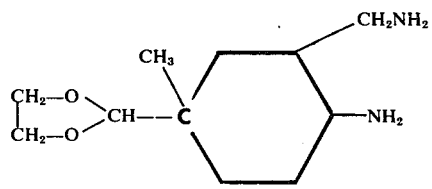

Within 2 hours 238 g of the product of Example (a) are hydrogenated in 600 ml of ethanol and 200 g of gaseous ammonia in an autoclave in the presence of 24 g of Raney nickel at 130°C and a pressure of 100 atmospheres. After the catalyst has been removed the distillative processing (using a 20 cm packed column) yields 168 g (69% of theory) of amine which boils at 108°–114°C/0.30 mm Hg.
A medium fraction was analysed.
Analysis $C_{11}H_{22}N_2O_2$ (M = 214.31).
calculated: C 61.64 H 10.34 N 13.07.
found: C 61.74 H 10.58 N 13.03.

At least two of the four possible stereoisomers can be detected by gas chromatography. The mass spectrum shows the molecular peak at $m/e$ 214 as well as a fragment at $m/e$ 197 which is formed from the molecule ion by elimination of $NH_3$.

The 2-[(4'-amino-1',3'-dimethyl)-cyclohexyl]-dioxolane, which melts at 130°–132°C/13 mm Hg, can be isolated from the first runnings by fractional distillation over a spinning band column.

Analysis $C_{11}H_{21}NO_2$ (M = 199.30).
calculated: C 66.30 H 10.30 N 7.03.
found: C 66.29 H 10.90 N 7.55.

The mass spectrum shows the molecular peak at $m/e$ 199.

2.
5,5-dimethyl-2-[(4'-amino-3'-aminomethyl-1'-methyl)cyclohexyl]-1,3-dioxan

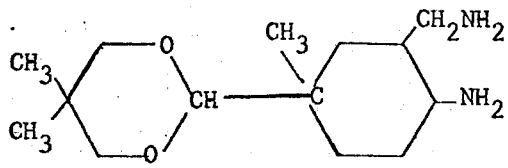

200 g of the product of Example (c) are hydrogenated in 300 ml of ethanol and 150 g of gaseous ammonia in an autoclave in the presence of 12 g of Raney nickel at 130°C and a pressure of 100 atmospheres within 2 hours. After the catalyst has been removed the mixture is concentrated in a rotary evaporator at a pressure of 10 mm Hg and a maximum bath temperature of 90°C, in the course of which 198.7 g of crude amine are obtained. The distillative processing over a 20 cm packed column yields 123 g (60% of theory) of amine which boils at 128°–135°C/0.5 mm. A sample boiling at 134°C/0.5 mm Hg was analysed.

Analysis $C_{14}H_{28}N_2O_2$ (M = 256.38).
calculated: C 65.58 H 11.01 N 10.93. found: C 65.56 H 11.20 N 10.91.

At least two of the four possible stereoisomers can be detected by gas chromatography.

The 5,5-dimethyl-2-[(4'-amino-1',3'-dimethyl)-cyclohexyl]-dioxolane with a boiling point of 101°C/0.5 mm Hg can be isolated from the first runnings.

Analysis $C_{14}H_{27}NO_2$ (M = 241.38).
calculated: C 69.67 H 11.27 N 5.80. found: C 70.25 H 11.37 N 5.95.

The gas chromatogram shows the amine to consist of at least two of the four possible stereoisomers. The mass spectrum shows the molecular peak at $m/e$ 241. The picrate melts at 214°–216°C.

3.
2,5,5-trimethyl-2-[(4'-amino-3'-aminomethyl-1'-methyl)cyclohexyl]-1,3-dioxan

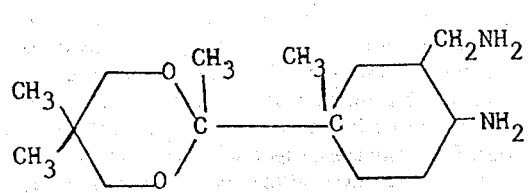

188 g of the product of Example d) are hydrogenated in 450 ml of ethanol and 150 g of gaseous ammonia in an autoclave in the presence of 20 g of Raney nickel at 130°C and a pressure of 100 atmospheres within 1 hour. The distillative processing over a 20 cm packed column yields 94 g (49% of theory) of amine with a boiling point of 185°–190°C/8 mm Hg.

Analysis $C_{15}H_{30}N_2O_2$ (M = 270.41).
calculated: C 66.62 H 11.18 N 10.36. found: C 66.34 H 11.45 N 10.31.

The 2,5,5-trimethyl-2-[(4'-amino-1',3'-dimethyl)-cyclohexyl]-1,3-dioxan with a boiling point of 168°C/8 mm Hg can be isolated from the first runnings as by-product in small quantity.

Analysis $C_{15}H_{29}NO_2$ (M = 255.40).
calculated: C 70.54 H 11.45 N 5.48.
found: C 69.93 H 11.23 N 6.05.

The mass spectrum shows the molecular peak at $m/e$ 255.

4.
3-[(4'-amino-3'-aminomethyl-1'-methyl)-cyclohexyl]-2,4-dioxa-spiro-[5,5]-8-undecene

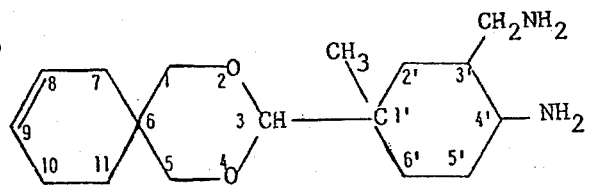

220 g of the product of Example (e) are hydrogenated in 600 ml of ethanol and 150 g of gaseous ammonia in an autoclave in the presence of 20 g of Raney nickel at 125°C and a pressure of 100 atmospheres within 4 hours. The distillative processing over a 60 cm Vigreux column yields 134 g (60% of theory) of amine with a boiling point of 148°–158°C/0.2 mm Hg. A sample boiling at 158°C/0.2 mm Hg was analysed.

Analysis $C_{17}H_{30}N_2O_2$ (M = 294.43).
calculated: C 69.34 H 10.27 N 9.52. found: C 68.69 H 10.96 N 9.35.

The NMR spectrum in deuterium loaded chloroform shows a complex multiplet for the two protons in 7-position at 5.5–5.7 ppm and characteristic of 3-substituted 2,4-dioxa-spiro-[5,5]-8-undecene.

5.
3-[(4'-amino-3'-aminomethyl-1'-methyl)-cyclohexyl]-2,4-dioxa-spiro-[5,5]-undecene

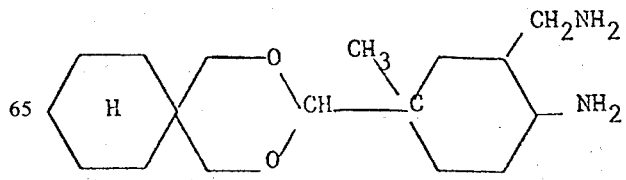

134 g of amine of Example 4 are hydrogenated for 14 hours in 500 ml of ethanol in an autoclave in the presence of 1.0 g of 5% platinum on charcoal at 160°C and a pressure of 100 atmospheres. The distillative processing over a 20 cm packed column yields 102 g of amine with a boiling point of 163°–167°C/0.3 mm Hg. The NMR spectrum in deuterium loaded chloroform shows no signal at 5.5–5.7 ppm in contrast to the starting product. Characteristic bands are found at 4.05/3.85/3.45 and 3.25 ppm for the protons in 1- and 5-position. The two singlets aat 4.58 and 4.64 ppm and at 1.00 and 0.93 ppm are to be attributed to the proton in 3-position and the methyl group in 1′-position. The presence of two singlets ineach case indicates the presence of at least two steroisomers.

6.
5-amino-5-methyl-2-[(4′-amino-3′-aminomethyl-1′-methyl)cyclohexyl]- 1,3-dioxan

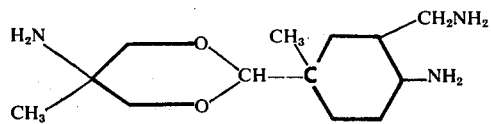

161 g of the product of Example (g) are hydrogenated within one hour in 600 ml of ethanol and 200 g gaseous ammonia in an autoclave in the presence of 15 g of Raney nickel at 120°–125°C and an initial pressure of 150 atmospheres. The distillative processing yields at least 46.6 g of pure amine with a boiling point of 123°C/0.008 mm Hg to 129°C/0.11 mm Hg. Further amounts of the triamine can be detected by gas chromatography in the first runnings.

Analysis $C_{15}H_{27}N_3O_2$ (M = 257.37).
calculated: C 60.66 H 10.57 N 16.33.
found: C 60.10 H 10.24 N 16.04.

7.
1-amino-2-aminomethyl-4-methyl-4-dibutoxymethyl-cyclohexane

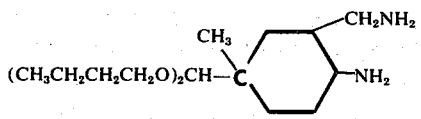

60 g of crude product of Example (h) are hydrogenated for 4 hours in 250 ml of ethanol and 150 g of gaseous ammonia in an autoclave in the presence of 10 g of Raney nickel at 140 atmospheres and 120°C. The distillative processing yields 31.7 g of amine which boils at 145°–148°C/0.50 mm Hg.

Analysis $C_{17}H_{36}N_2C_2$ (M = 300.47).
calculated: C 67.95 H 12.08 N 9.32.
found: C 67.78 H 12.32 N 9.45.

B.

USE EXAMPLES

The test specimens are manufactured by mixing the amines with the respective polyepoxide in the equivalent ratio of 1:1 (i.e. one active hydrogen atom bonded to amino nitrogen per epoxide group) at 20°–35°C, and then, after degassing it in vacuo, casting the mixture to sheets measuring 200 × 200 × 4 mm. The curing takes place at 80°C initially over 8 hours, subsequently at 140°C over 12 hours. Stresses are removed by heating the sheets for 6 hours to 160°C after they have been removed from the mould. The curable mixtures have the following composition:

Example I 130 parts of epoxide resin A, 36.4 parts of amine according to Example 1.

Example II 90 parts of epoxide resin A, 30.2 parts of amine according to Example 2, Example III 60 parts of epoxide resin A, 20.2 parts of crude amine according to Example 2.

Example IV 120 parts of epoxide resin B, 34.1 parts of crude amine according to Example 2.

Example V 120 parts of epoxide resin C, 48.8 parts of crude amine according to Example 2.

Example VI 60 parts of epoxide resin A, 21.2 parts of amine according to Example 3.

Example VII 60 parts of epoxide resin A, 23.2 parts of amine according to Example 5.

Example XI 75 parts of epoxide resin A, 16.8 parts of pure amine according to Example 6.

Example XII 75 parts of epoxide resin A, 16.8 parts of crude amine according to Example 6.

COMPARATIVE EXAMPLES

Example VIII 150 parts of epoxide resin A, 11.8 parts of ethylene diamine.

Example IX 135 parts of epoxide resin A, 30.0 parts of isophorondiamine.

Example X 130 parts of epoxide resin A, 33.7 parts of bis-(p-aminophenyl)-methane.

The test specimens have the properties listed in the Table.

The relatively high values of the heat distortion of the test specimens manufactured with epoxide resin A (use examples I, II, VI, and VII) are to be highlighted. These values surpass those of comparative examples VIII and IX, in which the conventional commercially obtainable aliphatic amines, ethylenediamine and isophorondiamine, were used as amine components. Comparative example X with bis-(p-aminophenyl)-methane as amine component does have rather higher heat distortion values, but on account of its aromatic character it is not altogether harmless from the physiological point of view for many uses, especially those in which the end products come into contact with articles of food.

| Use Example | HD °C | FS kg/mm² | D mm | IS cm kg/cm² | TS kg/mm² | E % | WA % by weight |
|---|---|---|---|---|---|---|---|
| I | 141 | 12,8 | 9,2 | 13,3 | 4,1 | 2,0 | 0,37 |
| II | 148 | 7,4 | 4,3 | 8,1 | 5,5 | 1,6 | 0,35 |
| III | | 8,1 | 4,4 | — | — | — | 0,31 |
| IV | | 1,8 | 1,6 | — | — | — | 0,28 |
| V | | 5,3 | 2,6 | — | 4,3 | 0,8 | 0,64 |
| VI | 142 | 8,4 | 4,7 | — | — | — | 0,32 |
| VII | 141 | 9,5 | 7,4 | 9,6 | — | — | 0,27 |
| XI | 180 | 13,3 | 7,1 | — | — | — | 0,39 |
| XII | 165 | 11,7 | 6,4 | — | — | — | 0,37 |
| VIII | 117 | 13,4 | 10,6 | — | 8,6 | 8,3 | — |
| IX | 105 | 9,7 | 15,8 | — | 7,3 | 9,2 | — |
| X | 152 | 11,8 | 10,2 | — | 8,6 | 7,8 | — |
| DT-OS 1 909 343 (Example 3) | 134 81–82 Martensvalue | | | | | | |

Explanation of column headings:
HD = heat distortion, DIN 53461
FS = flexural strength, VSM 77103
D = deflection, VSM 77103
IS = impact strength, VSM 77105
TS = tensile strength, VSM 77101
E = elongation, VSM 77101
WA = water absorption after 4 days at 20°C

We claim:

1. A 1-amino-2-aminomethyl-cyclohexane derivative of the formula

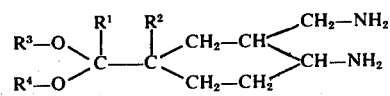

wherein $R^1$ and $R^2$ are the same or different and are hydrogen or alkyl of 1 to 5 carbon atoms, and $R^3$ and $R^4$ together are an unsubstituted or substituted alkylene radical with 2 to 3 carbon atoms in the main chain, in which case $R^3$ and $R^4$ can together contain an additional amino group.

2. Compounds according to claim 1, wherein $R^3$ and $R^4$ together represent one of the divalent radicals

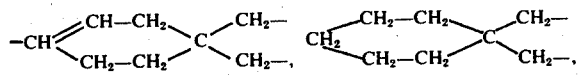

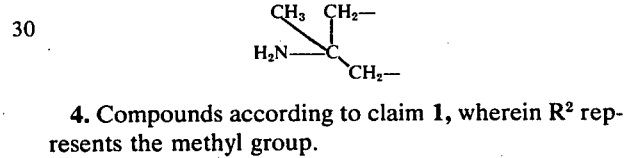

3. A compound according to claim 1, wherein $R^3$ and $R^4$ toether represent the radical

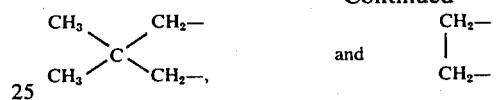

4. Compounds according to claim 1, wherein $R^2$ represents the methyl group.

5. Compounds according to claim 1, wherein $R^1$ represents a hydrogen atom or the methyl group.

6. 5-Amino-5-methyl-2-[(4'-amino-3'-aminomethyl-1'-methyl)-cyclohexyl]-1,3-dioxan.

7. 2-[(4'-Amino-3'-aminomethyl-1'-methyl)-cyclohexyl]-dioxolan.

8. 5,5-Dimethyl-2-[(4'-amino-3'-aminomethyl-1'-methyl)-cyclohexyl]-1,3-dioxan.

9. 3-[(4'-Amino-3'-aminomethyl-1'-methyl)-cyclohexyl]-2,4-dioxa-spiro-[5,5]-8-undecen.

* * * * *